Oct. 5, 1937.　　　　　E. S. SAVAGE　　　　　2,094,621
MOTOR
Filed June 6, 1935　　　　　6 Sheets-Sheet 1

INVENTOR
Edward S. Savage.
BY Edward H. Cumpston
ATTORNEY

Oct. 5, 1937.   E. S. SAVAGE   2,094,621
MOTOR
Filed June 6, 1935   6 Sheets-Sheet 2

INVENTOR
Edward S. Savage.
BY Edward H. Cumpston
ATTORNEY

Oct. 5, 1937.    E. S. SAVAGE    2,094,621
MOTOR
Filed June 6, 1935    6 Sheets-Sheet 3

INVENTOR
Edward S. Savage.
BY Edward H. Cumpston
ATTORNEY

Oct. 5, 1937. E. S. SAVAGE 2,094,621
MOTOR
Filed June 6, 1935 6 Sheets-Sheet 4

INVENTOR
Edward S. Savage
BY Edward H. Cumpston
ATTORNEY

Oct. 5, 1937. E. S. SAVAGE 2,094,621
MOTOR
Filed June 6, 1935 6 Sheets-Sheet 5

INVENTOR
Edward S. Savage.
BY Edward H. Cumpston
ATTORNEY

Oct. 5, 1937.  E. S. SAVAGE  2,094,621
MOTOR
Filed June 6, 1935  6 Sheets-Sheet 6

INVENTOR
Edward S. Savage.
BY Edward H. Cumpston
ATTORNEY

Patented Oct. 5, 1937

2,094,621

UNITED STATES PATENT OFFICE 2,094,621

MOTOR

Edward S. Savage, Rochester, N. Y.

Application June 6, 1935, Serial No. 25,287

31 Claims. (Cl. 60—27)

This invention relates to a motor and more particularly to a motor for transferring heat energy (such as produced by a flame or burner, for example) into energy of another form to accomplish useful work (such as the rotation of a power shaft, for example).

An object of the invention is to produce a simple and effective motor of few parts, which is easy and inexpensive to manufacture and sturdy in construction and operation.

Another object of the invention is the provision of a motor which may be constructed in form and size suitable either for toys or for practical industrial uses, as desired.

A further object is the provision of a light, compact motor, having relatively high efficiency and power output in comparison to its size and weight.

To these and other ends the invention resides in certain improvements and combinations of parts, all as will be hereinafter more fully described, the novel features being pointed out in the claims at the end of the specification.

In the drawings:

Fig. 16 is a view partly in elevation and partly in longitudinal vertical section through another embodiment of motor constructed in accordance with the present invention and designed particularly for driving an automobile or the like;

The same reference numerals throughout the several views indicate the same parts.

Figures 1, 2, 3, 22:
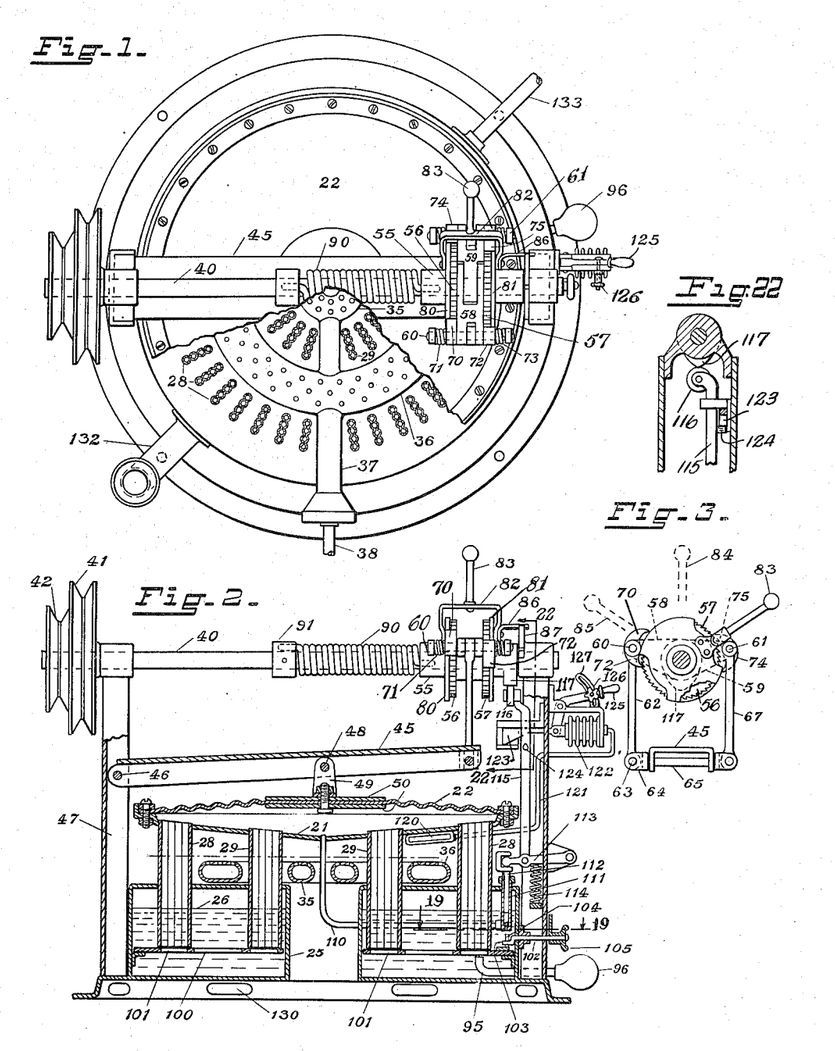
Fig. 1 is a plan of one embodiment of motor constructed in accordance with the present invention, with parts broken away to show the construction beneath.
Fig. 2 is a vertical section taken substantially centrally through the motor shown in Fig. 1.
Fig. 3 is a detail elevation of part of the reversing mechanism.
Fig. 22 is a vertical section taken substantially on the line 22—22 of Fig. 2.

Referring now to Figs. 1 and 2 of the drawings, there is shown a motor comprising walls forming chamber means. These walls include a lower wall 21 and an upper wall 22, both preferably but not necessarily of approximately circular form, and spaced from each other throughout their central portions but joined to each other in a fluid tight manner at their peripheries. One of the walls forming this chamber means is readily movable. Preferably it is the upper wall which is thus movable, and the wall may be made flexible by concentric circular corrugations or the like so that its central portion may readily move upwardly and downwardly with respect to its periphery which is fixed to the rear wall 21.

In connection with this chamber means formed by the walls 21 and 22, there is provided, outside of the chamber means, a supply of vaporizable liquid, which liquid may conveniently be water. In the present instance, an annular tank 25 is provided for holding water to a level 26. The liquid level 26 may be above or below the chamber means, but in the present instance it is shown as being below the chamber means as this arrangement is usually preferred.

One or more conduits connect the chamber means to the vaporizable liquid supply. While one or a few conduits can be used under some circumstances, it is usually preferred to employ a considerable number of such conduits which may be termed, for example, a multiplicity of conduits. The conduits may extend obliquely or in any other desired way from the chamber means to the liquid supply, although better results are frequently obtained if the conduits extend substantially vertically downwardly from the chamber means to a liquid supply beneath the chamber means, such an arrangement being illustrated in Fig. 2.

In the arrangement shown in Figs. 1 and 2, there are two substantially circular series of such conduits, the conduits of the outer circumferential series being designated by the numeral 28 and the conduits of the inner series being designated by 29. The two series of conduits may be substantially concentric with each other.

Figure 4:
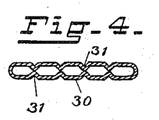
Fig. 4 is a horizontal section through one form of water conduit with which the motor may be equipped.
Figure 5:
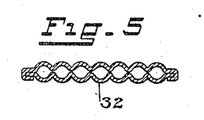
Fig. 5 is a similar view of another form of conduit with which the motor may be equipped.

While the conduits may be of various forms, it is preferred at present to have them of an elongated shape in horizontal cross section. Their longest dimensions may conveniently extend in a radial direction as shown in Fig. 1. When the conduits are thus elongated in one direction, they are preferably subdivided into a number of channels or passageways, so that no one liquid channel or passageway is of large cross sectional area. The subdivision may be accomplished by forming partitions in any suitable manner, such as by corrugating the conduits longitudinally, as shown for example in Figs. 4 and 5. In Fig. 4, the conduit 30 has V-shaped corrugations 31 running longitudinally along it and these corrugations extend inwardly from the side walls sufficiently far to touch or substantially touch each other as plainly seen in the drawings, to form, in the example shown, partitions subdividing the conduit into five different channels or passageways. In Fig. 5 there is a slightly different form of construction shown, in which the conduit 32 is corrugated in a somewhat wavy manner to form a number of substantially circular channels or passageways. Any other suitable form of corrugation or partition may be employed, as desired, the purpose being to provide a large total cross sectional area of conduits at a minimum of expense and with no one channel of any large size, because it is found by experiment that when any conduit channel has a relatively large cross sectional area, the water or other vaporizable liquid rising and falling in this channel during operation of the motor tends to form a froth. If only channels of relatively small size are employed, on the other hand, then this frothing of the liquid as it rises and falls in the conduit does not occur, and the operation of the motor is more efficient. The sizes of the conduit channels may be varied according to circumstances and the judgment of the designer. Good results have been obtained from conduits subdivided so that each individual channel has a maximum cross sectional dimension of not more than about a quarter of an inch, and in some small sized motors, improved results are obtained if the maximum cross sectional dimension of each channel is not more than about one-eighth of an inch.

Any suitable means is provided for supplying heat to the chamber means. Frequently, the heat may be applied most conveniently to the lower wall of the chamber means. The heating means may be, for example, an alcohol burner, a gas burner, or of any other suitable form. In the present instance, a gas burner is provided, this burner having an inner ring 35 and an outer ring 36 supplied with fuel through supply conduits 37 and 38, the ring 35 being placed within the inner circumferential series of conduits 29 and the outer burner ring 36 being placed between the two series of conduits 28 and 29. The burner rings are provided with the usual perforations in their upper walls so that the fuel escaping upwardly through these perforations may burn to apply heat to the lower wall 21 of the chamber means.

With a small quantity of liquid initially introduced into the chamber means to start operation, it is found that the application of heat to the chamber means will cause rapid intermittent variations in pressure within the chamber means, and these pressure variations, in turn, will cause movement of the movable wall of the chamber means. In the arrangement described, the upper flexible wall 22 of the chamber means acts as a diaphragm and vibrates rapidly upwardly and downwardly.

The exact scientific explanation of the pressure variations within the chamber means may not be fully understood at present, but is believed to be approximately as follows:—

The heat applied to the chamber means vaporizes part or all of the water or vaporizable liquid within the chamber means and thus creates a pressure within the chamber means. This pressure tends to expel the liquid from the conduits 28 and 29. When the liquid in these conduits is driven down to a level below the liquid level 26 in the liquid supply tank, the vapor within the conduits comes in contact with relatively cool portions of the conduit walls, which are cooled by reason of the surrounding body of cool liquid.

The contact of the vapor with the cool conduit walls causes quick condensation of part of the vapor, which thus reduces the pressure within the chamber means, and produces a partial vacuum therein, at least in some forms of the motor. The reduced pressure in the chamber means then causes the liquid to flow upwardly in the conduits, perhaps into the main chamber means itself, or at least sufficiently far up to come in contact with the relatively hot walls of the conduits near their upper ends, which walls are heated by conduction from the heat applied to the wall 21 of the chamber means, and by direct contact with the flame. The liquid entering the hot chamber means or the hot upper ends of the conduits becomes vaporized, which thus increases the pressure within the chamber means, and again tends to expel liquid from the conduits, which causes condensation of part of the vapor and reduction of the pressure, and the cycle is thus repeated over and over again.

In various motors which the applicant has constructed according to this invention, the pressure variations within the chamber means occur quite rapidly, and the diaphragm 22 or other flexible wall of the chamber means vibrates exceedingly rapidly and the vibrations are surprisingly powerful.

The power or energy produced by the movements of the movable wall of the chamber means may be harnessed or applied in any suitable manner. In the embodiment illustrated in Figs. 1 and 2 the movements of the movable wall 22 are caused to rotate a suitable rotary member, such as a shaft 40 carrying pulleys 41 and 42 over which belts may run to drive any other desired machinery or the like. The operative connection between the movable wall of the chamber means and the shaft 40 may conveniently be obtained by providing a lever arm 45 fulcrumed at 46 to a standard or frame member 47. This lever arm 45 is pivoted at 48 to a bracket 49 mounted on and extending upwardly from the movable wall 22 of the chamber means, reinforcing plates 50 preferably being applied to both sides of the movable wall around the point of attachment of the bracket 49. It is thus apparent that the upward and downward movements of the movable wall 22 will cause corresponding oscillation of the lever arm 45 about its fixed pivot 46 as a center.

Rotatably mounted on the shaft 40 is a sleeve 55 having two ratchets 56 and 57 fixed to it. The teeth of the ratchet 56 face in a direction opposite to the teeth of the ratchet 57. As seen in Figs. 1 and 2, these two ratchets 56 and 57 are spaced from each other axially of the sleeve 55, and two arms 58 and 59 are rotatably mounted on the sleeve 55 in the space between the two ratchets. Each of these arms 58 and 59 is forked at its outer end and the forked ends carry pivot pins 60 and 61, respectively.

A driving rod 62 encircles the pin 60 in the space between the forked portions of the arm 58 and extends downwardly to the lever 45, to which it is pivotally connected in any suitable manner. For example, the lower end of the driving rod 62 may be pivoted at 63 to a fixture 64 on the end of a rod 65 extending transversely through and rotatable in the lever arm 45, this arrangement providing practically a universal joint between the driving rod 62 and the lever arm 45 so that the driving rod may move as required. A second driving rod 67 encircles the pin 61 on the arm 59 and extends downwardly to the lever arm 45, to which it is connected in a manner similar to the connection between the rod 62 and the lever 45.

One end of the pivot 60 carries a pawl 70 held in engagement with the ratchet 56 by means of a spring 71, and the opposite end of the pivot pin 60 carries a similar pawl 72 held in engagement with the other ratchet 57 by a spring 73. Likewise, the other pivot pin 61 carries two pawls with their associated springs for engagement with the two ratchets, the pawl 74 engaging the ratchet 56 and the pawl 75 engaging the ratchet 57.

These pawls are slightly wider than the widths of the ratchets 56 and 57 and project beyond the outer sides of the ratchets to overlie cam plates 80 and 81 pivotally mounted on the sleeve 55 just outside of the ratchets. These two cam plates 80 and 81 are connected to each other by a yoke 82 having an operating handle 83. The cams are so designed that when the handle 83 is in a central position indicated by the dotted lines 84 in Fig. 3, all four of the pawls are held out of engagement with the ratchets, and thus the drive is disconnected. When the handle 83 is shifted to the full line position shown in Figs. 1 and 3, recessed portions of the cams come opposite the pawls 72 and 75 and permit these pawls to engage the teeth of their ratchet 57 while holding the pawls 70 and 74 out of engagement with their ratchet 56. If the handle 83 be swung over to the other side of its central position, to the position indicated in Fig. 3 by the dotted lines 85, then the cams hold the pawls 72 and 75 out of engagement with the ratchet 57 and permit the pawls 70 and 74 to engage the ratchet 56. The yoke 82 carries a resilient arm 86 sliding over a stationary sector 87 and engaging in notches thereof to hold the yoke frictionally in any one of the three positions to which it may be set.

It is now apparent that the arrangement described provides a reversible drive for the sleeve 55 on which the ratchets 56 and 57 are mounted. For example, with the handle 83 in the full line position shown in Fig. 3, the pawls 70 and 74 have no effect upon the ratchet 56, but the pawls 72 and 75 are effective upon the ratchet 57. Consequently, when the lever arm 45 is moved upwardly by an upward movement of the movable wall 22, the driving rods 62 and 67 will move the pivot pins 60 and 61 upwardly, carrying all of the pawls upwardly. The pawl 72 will click idly over the ratchet 57 while the pawl 75 will drive this ratchet in a counterclockwise direction when viewed as in Fig. 3. When the pressure falls within the motor chamber and the arm 45 moves downwardly, the driving rods 62 and 67 will pull all of the pawls downwardly and the pawl 75 will click idly over the ratchet 57 while the pawl 72 will drive this ratchet likewise in a counterclockwise direction. Thus each upward movement and each downward movement of the movable wall of the motor chamber causes counterclockwise driving of the ratchet 57 and corresponding counterclockwise driving of the sleeve 55 to which this ratchet is secured.

Correspondingly, when the handle 83 is shifted over to the reversed position indicated at 85 in Fig. 3, the pawls 72 and 75 will be ineffective, but the pawls 70 and 74 will drive the ratchet 56 in a clockwise direction upon either upward or downward movement of the lever arm 45.

As previously stated, the pressure variations within the motor chamber are quite rapid, so that although the sleeve 55 is theoretically driven intermittently, yet in practice it rotates almost continuously in the desired direction. To smooth out the slightly intermittent character of the rotary motion and to make the shaft 40 turn with a more nearly truly continuous rotation, the sleeve 55 is preferably connected to the shaft 40 by resilient means such as the long coiled spring 90, surrounding the shaft 40, one end of the spring being secured to the sleeve 55 and the other end being secured to a collar 91 fixed to the shaft 40. The driving impulses transmitted to the sleeve 55 are somewhat absorbed by the spring 90, with the result that the shaft 40 turns substantially smoothly and continuously, and anything driven from the pulleys 41 and 42 is driven smoothly and in a substantially continuous manner.

In order to prepare the motor for initial operation, or prime it, it is desirable to have some convenient means for introducing a small quantity of the vaporizable liquid into the motor chamber. In large sized motors, this may be done by any convenient pump or the like. In small motors, it is found convenient to provide a tube 95 (Fig. 2) having an end alined with one of the conduits 28 leading from the motor chamber to the liquid, and a rubber bulb 96 on this tube 95 and accessible at some external position. If the bulb 96 be squeezed suddenly and forcibly, a jet of water or other vaporizable liquid in the tank 25 will be shot upwardly from the open end of the tube 95 and will flow up the associated conduit 28 into the motor chamber.

It is found that the motor will start more readily if the conduits leading from the motor chamber into the vaporizable liquid be somewhat constricted to reduce the possibility of flow through these conduits. This may conveniently be accomplished by providing valve means such as a plate 100 (Figs. 2 and 19) arranged in the tank 25 just beneath the bottom ends of the conduits 28 and 29. This plate has apertures 101 which register with the bottom ends of the conduits when the plate is in one position. If the plate be shifted to a different position, it blocks more or less of the area of the bottom ends of the conduits 28 and 29, and thus throttles down these conduits or reduces the capacity of flow through them.

When the liquid tank 25 is of annular form as here shown, the plate 100 may be of corresponding annular form and may be caused to rotate in a horizontal plane to open or close the conduit openings to the desired degree. For example, a shaft 102 may extend laterally into the tank 25 through one side thereof and may carry an eccentric portion 103 extending into a slot in a member 104 attached to the valve plate 100, so that as the shaft 102 is turned from an externally accessible handle 105, the plate 100 may be rotated slightly in one direction or the other.

The adjustment of the valve 100 is useful not only in starting, but also in controlling, to some extent, the power output of the motor. After the motor has heated up sufficiently and is running well, the valve 100 is preferably moved to the position providing maximum unrestricted flow through the conduits 28 and 29, and the motor will continue to operate at high power. If it is desired to reduce the power of the motor, however, the valve can be partially closed and the power will decrease.

When relatively high power output is desired, it is found that the power is increased if a slight quantity of water or other vaporizable liquid is forced into the motor chamber from time to time during operation, in addition to such liquid as may enter the chamber through the conduits 28 and 29 due to the pressure variations within the chamber. In the embodiment here shown, the additional liquid required for high power is introduced through a conduit 110 leading from a pump 111 to the motor chamber. This pump has a plunger 112 operated by an arm 113 which is moved upwardly by a spring 114 and downwardly by a rod 115 having at its upper end a roller 116 depressed at each revolution of the sleeve 55 by a cam 117 mounted on this sleeve. Thus, at each revolution of the sleeve, the rod 115 is depressed to depress the pump plunger 112 and force a quantity of liquid from the tank 25 through the conduit 110 into the chamber means of the motor, and it is found that this materially increases the power of the motor.

It is found that the amount of liquid introduced into the motor chamber during operation for producing higher power should preferably vary somewhat with the temperature of the chamber, a greater amount being introduced when the chamber is hotter and a smaller amount being introduced when the chamber is cooler. Accordingly, the pump 111 may conveniently be controlled thermostatically. For instance, as shown in Fig. 2, a heat responsive element 120 may conveniently be placed against the wall 21 of the chamber and may be connected by a connection 121 to the expansible element 122, so that as the heat of the chamber wall 21 rises, the element 122 will expand and as the heat of the chamber wall falls, the element 122 will contract. The element 122, in turn, is connected to a cam 123 which overlies a projection 124 on the pump operating rod 115.

When the motor chamber is relatively cool, the expansible element 122 is contracted and this moves the cam 123 to a position which prevents the pump rod 115 from rising to any extent or to any great extent from its lowermost position, thus throwing the pump substantially out of operation. As the temperature of the motor chamber rises, the expansion of the element 122 moves the cam 123 further leftwardly when viewed as in Fig. 2, permitting the pump rod 115 to rise under the influence of the spring 114 and thus to be affected by the rotation of the cam 117, the stroke of the pump increasing more and more as the temperature of the motor chamber rises until finally the cam 123 no longer restrains the pump rod 115 at all, and this rod has its maximum stroke upon each rotation of the cam 117, thus pumping the maximum amount of liquid into the motor chamber.

The pump delivery may also be manually adjusted by means of a handle 125 connected to the cam 123 and held in any desired position by any suitable means such as a clamping nut 126 on a bolt secured to the handle 125 and extending through a slot in an arcuate guide 127, to overcome the force of the expansible element 122 and determine the position of the cam 123 notwithstanding the automatic thermostatic control.

If any further air is needed for supporting combustion of the gas issuing from the burner in addition to the air mixed with the gas in the conduit 37, the additional air may enter the base of the motor through suitable holes 130 and pass upwardly through the central space or opening through the annular liquid tank 25.

The liquid tank may conveniently be filled as required through a spout 132 (Fig. 1) and it may be provided with an overflow conduit 133 to determine the proper liquid level, so that liquid may be added intermittently or continuously to keep a plentiful supply of cool liquid in the tank at all times.

Figure 6:
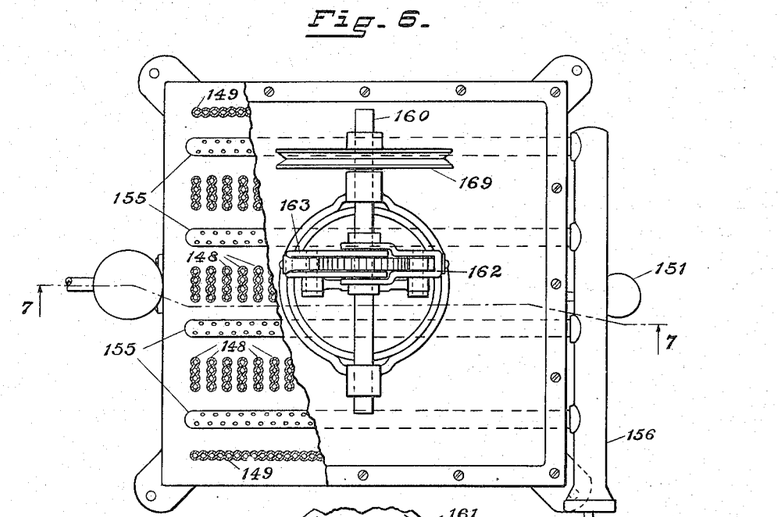
Fig. 6 is a view similar to Fig. 1 showing a slightly different form of motor.
Figure 7:
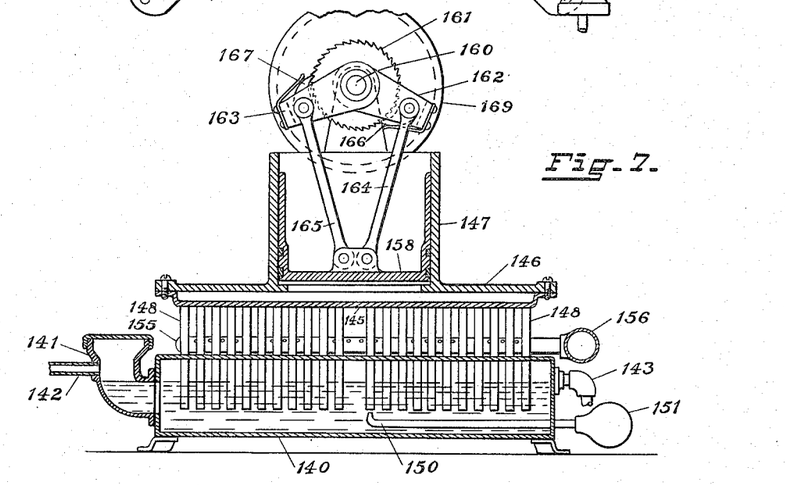
Fig. 7 is a vertical section taken substantially on the line 7—7 of Fig. 6.

A slightly different form of motor constructed in accordance with the same principles of the invention is illustrated in Figs. 6 and 7. Here, the tank for holding water or other vaporizable liquid is indicated at 140, and cool liquid may be supplied to the tank intermittently or continuously through a suitable spout 141 or through a supply conduit 142 leading to this spout. The liquid added circulates through the tank and passes out through an overflow conduit 143, which determines the liquid level. Above the top of the tank 140 is the chamber means, including a bottom wall 145 which is preferably flat and of considerable area, and a top wall 146 having a cylinder 147 projecting upwardly therefrom. The conduits 148 and 149 extend downwardly from the chamber into the liquid, and a priming tube 150 has its open end arranged in alinement with one of the conduits and is provided with a rubber bulb 151 which, when squeezed, will force some of the liquid up through the alined conduit into the motor chamber.

The liquid conduits in this instance are arranged in three parallel rows of conduits 148, as seen in Fig. 6, with two wide conduits 149 along the sides. Heat is supplied through the burners 155 arranged between the conduits and supplied with gas or other suitable fuel through the member 156.

As before, the application of heat to the chamber means will cause intermittent pressure variations within the chamber means. In this embodiment, however, the movable wall of the chamber means which moves in response to the pressure variations is formed not by a flexible diaphragm but by a rigid piston 158 fitting within the cylinder 147 and capable of moving upwardly and downwardly therein. The piston slides easily within the cylinder but has suitable packing to provide a substantially fluid-tight joint with the cylinder.

A shaft 160 extends across the motor above the cylinder and piston and is provided with a ratchet 161. Two arms 162 and 163 are rotatably mounted on the shaft and are connected to the piston by rods 164 and 165, respectively. These arms carry pawls 166 and 167, respectively, for engagement with the ratchet 161.

As the pressure within the motor chamber increases, the piston 158 moves upwardly and thus moves both of the arms 162 and 163 upwardly. During this upward movement the pawl 167 engages the ratchet 161 and turns the ratchet and its shaft 160 in a clockwise direction when viewed as in Fig. 7, while the pawl 166 simply clicks idly over the ratchet. Then during the subsequent downward movement of the piston 158, the arms 162 and 163 are pulled downwardly to a position substantially as shown in Fig. 7, and during this downward movement, the pawl 166 engages the ratchet 161 and drives this ratchet likewise in a clockwise direction, while the pawl 167 simply clicks idly over the ratchet. Thus the shaft 160 is rotated by the intermittent pressure variations within the motor chamber and the rotation of the shaft may be transmitted through a belt on the pulley 169, to any desired machine.

While a simple one-way drive is shown in Figs. 6 and 7, it is obvious that this embodiment of the invention or any of the other embodiments hereafter described, can be provided with the reversible drive previously described and illustrated in Figs. 1, 2, and 3.

Figures 8, 9, 10, 20:
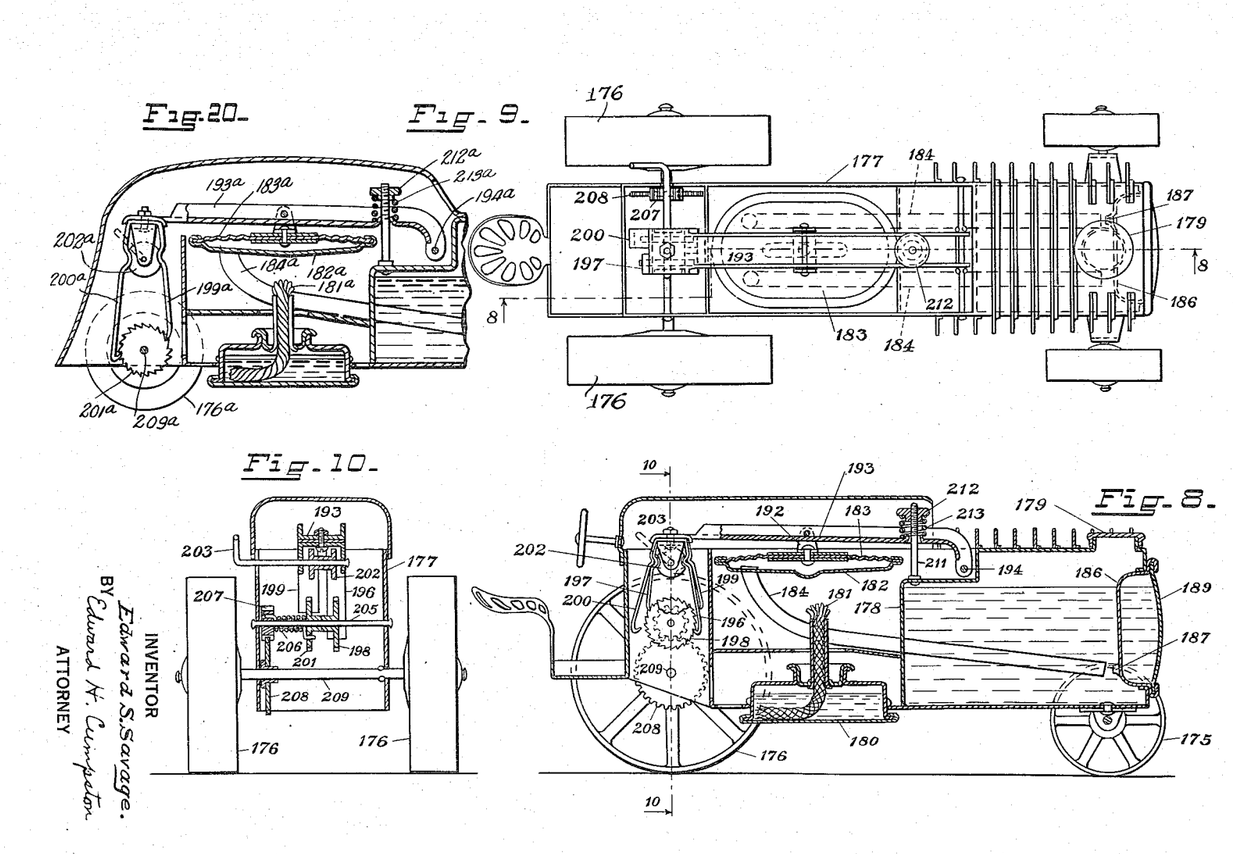
Fig. 8 is a vertical section taken substantially centrally through one form of motor of the present invention applied to a toy tractor.
Fig. 9 is a plan of the parts shown in Fig. 8 with the cover removed to show the interior construction.
Fig. 10 is a transverse vertical section through the mechanism taken substantially on the line 10—10 of Fig. 8.
Fig. 20 is a view similar to Fig. 8 illustrating a slight modification of the structure shown in Fig. 8.

In Figs. 8, 9, and 10, there is illustrated a toy tractor driven by a motor constructed in accordance with this invention. This toy tractor includes front wheels 175, rear wheels 176, and a body indicated in general by the numeral 177. At the forward end of this body is a tank compartment 178 for holding the supply of water or other vaporizable liquid, which tank may be filled through a filling opening covered by a removable cap 179.

Rearwardly of the tank 178 is a removable alcohol burner 180 having a wick 181 which, when lighted, applies heat to the lower wall 182 of the chamber means, the upper wall of which is constituted by the flexible metallic diaphragm 183. Conduits 184 lead from the chamber means downwardly and into the supply of liquid within the tank 178.

For the purpose of priming the motor for initial starting, the forward end of the tank 178 may be provided with a supplementary tank or compartment 186 having, as its only connection with the main body of liquid, a small opening surrounded by a flange 187 which constitutes a nozzle in alinement with one of the conduits 184. The front wall 189 of this subsidiary liquid compartment 186 is flexible, being conveniently formed of rubber or thin flexible metal. If this flexible wall 189 be pushed rearwardly, the liquid within the compartment 186 will be forced rapidly out through the nozzle 187 and some of it will pass up the associated tube 184 and into the chamber means of the motor, thus conditioning it ready for operation.

As previously explained, the application of heat to the motor chamber will cause rapid vibration of the movable wall 183 of the chamber. This wall is connected by the member 192 to the lever arm 193 pivoted at a fixed point 194. The opposite end of the lever arm carries the spring pawls 196 and 197 which operate upon the ratchet 198 to drive this ratchet in one direction, and also the other pawls 199 and 200 which operate upon a second ratchet 201 to drive this ratchet in the opposite direction, in the same general manner as the reversible drive described in connection with Figs. 1, 2, and 3. Cams 202 adjustable by a handle 203 serve to throw one set or the other set or both sets of pawls out of operation as desired.

The two ratchets 198 and 201 are secured to each other to rotate freely on a shaft 205, and are connected through a coiled spring 206 to the pinion 207 which meshes with a gear 208 on the shaft 209 on which the rear tractor wheels are mounted. If desired, the ratchets 198 and 201 could be secured directly on the driving wheel shaft 209, dispensing with the intermediate driving parts. This direct drive would be especially suitable for toy automobiles, where the driving wheels are proportionately smaller than in the toy tractor. Such a direct drive is illustrated in Fig. 20, in which the pawls 199a and 200a operate upon a ratchet 201a fixed directly to the shaft 209a of the driving wheels 176a. The other parts in Fig. 20 have the same reference numerals as the corresponding parts in Figs. 8-10, with the addition of the letter a.

It is seen that by suitable manipulation of the handle 203, either set of driving pawls may be rendered effective upon its proper ratchet, so that the tractor may be driven either forwardly or rearwardly, or may remain stationary.

It is difficult to manufacture a small metallic diaphragm such as the diaphragm 183 without giving this diaphragm a "set" or tendency to assume a position to one side or the other of its neutral or mean position. Such a set of the diaphragm would cause undue resistance and drag, making starting of the motor and continued efficient operation thereof more difficult. To overcome this, suitable spring tension may be applied to the diaphragm or to the lever arm 193 in order to counterbalance the "set" of the diaphragm. In the arrangement illustrated, a fixed rod 211 extends upwardly through a hole in the lever arm 193 and is provided with an adjustable nut 212, a coiled spring 213 being interposed between the nut and the lever arm. If it is assumed that the set of this diaphragm is upwardly, causing the diaphragm to tend to remain in its uppermost position, then the tension of the spring 213 can be adjusted by suitable adjustment of the nut 212 so that it counterbalances the upward tendency of the diaphragm and causes the diaphragm to tend to remain in its neutral or central position. Pressure variations within the motor chamber will then produce a satisfactory and smooth vibration of the diaphragm, with a minimum of drag or resistance. If the set of the diaphragm is downwardly rather than upwardly, the spring would, of course be applied below the lever arm 193 rather than above it, to tend to push the lever arm upwardly. This arrangement for counterbalancing the set of the diaphragm may obviously be applied to all of the other embodiments of the invention herein described, if required, and it is thought to be unnecessary to illustrate it or refer to it in connection with each separate embodiment.

Figure 11:
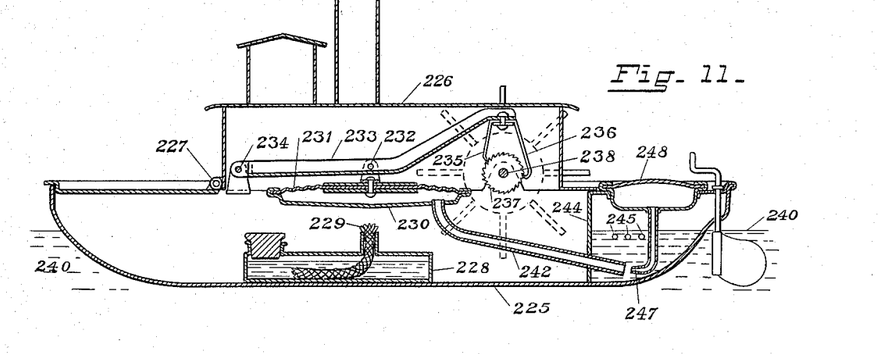
Fig. 11 is a longitudinal vertical section taken substantially centrally through one form of motor of the present invention applied to a toy boat.
Figure 12:
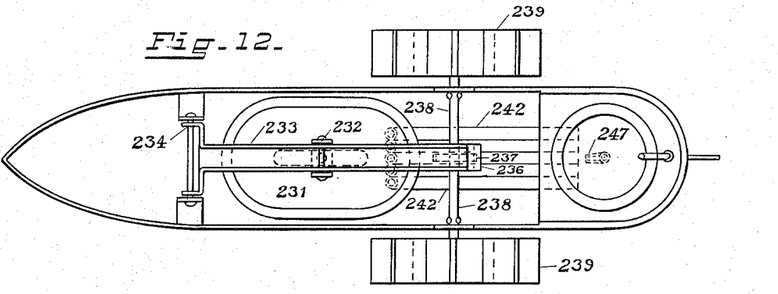
Fig. 12 is a plan of the boat shown in Fig. 11 with the cabin and deck removed.

In Figs. 11 and 12 of the drawings there is illustrated a toy boat propelled by a motor of the present invention. The boat comprises a hull 225 having a cabin structure 226 pivoted at its forward edge to the hull at 227 so that the cabin structure can be lifted to obtain access to the interior of the hull. In the hull is placed an alcohol burner 228 having a wick 229 for producing a flame to heat the lower wall 230 of the motor chamber means, the upper wall of which is constituted by the flexible diaphragm 231 pivotally connected at 232 to the lever arm 233 which is fulcrumed at a fixed point 234. The rear end of the lever arm is provided with pawls 235 and 236 operating upon a ratchet 237 on a shaft 238 which is journaled in the hull and extends laterally at both sides thereof and is provided with paddle wheels 239 for driving the boat through the water 240 in which it floats.

Conduits 242 extend from the motor chamber means into any suitable supply of water. For instance, these conduits may extend out through the hull to the water 240 in which the boat floats, or they may extend as here shown, into a separate supply of water within a tank 244 at the stern of the boat. This tank 244 is provided with holes 245 just below the water line of the boat, these holes being the only connection between this tank and the outside water. Consequently, when the boat is floating in the water 240, the tank 244 is kept full of water to the same level as the outside water. But if the boat be lifted out of the water 240, the tank 244 remains full of water up to the level of the holes 245 and thus the motor will continue to operate even when the boat is lifted out of the water.

For priming purposes a nozzle 247 may be provided in alinement with one of the conduits 242 which nozzle is connected to a chamber having a flexible wall 248 which, when depressed, will force liquid from the member 247 up through the associated conduit 242 into the motor chamber.

The operation of this motor will be apparent from the description of the preceding embodiments. The intermittent pressure variations within the motor chamber cause the diaphragm 231 to vibrate upwardly and downwardly, which causes upward and downward movements of the lever arm 233. During the upward movements, the pawl 236 will operate on the ratchet 237 to drive the paddle wheels 239 and on the downward movements the pawl 235 will similarly operate to drive the paddle wheels, the paddle wheels turning constantly in a forward direction whether the diaphragm and lever arm move upwardly or whether they move downwardly.

Figure 13:
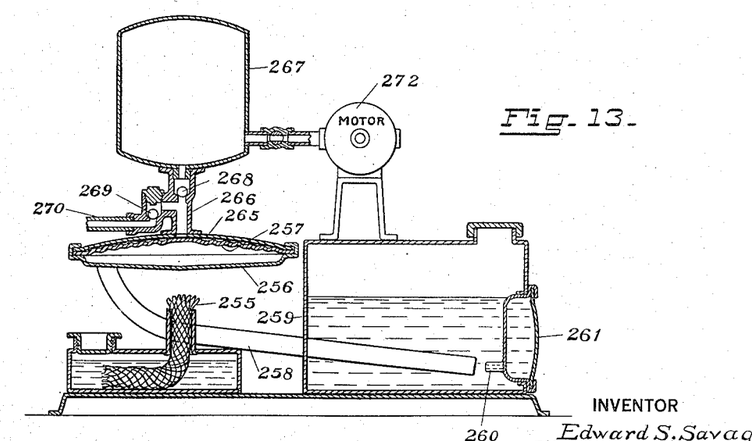
Fig. 13 is a view partly in vertical section and partly diagrammatic, showing a motor constructed in accordance with another embodiment of the present invention.

A slightly different embodiment of the invention is illustrated in Fig. 13. Here a burner 255 applies heat to the lower chamber wall 256. The upper flexible chamber wall is indicated at 257. Conduits 258 extend into a suitable liquid tank 259, and a priming nozzle 260 in alinement with one of the conduits is effective, upon movement of the flexible wall 261, to force a quantity of liquid up the conduit 258 into the motor chamber to condition the motor ready for operation.

In this instance, instead of taking the power from the vibrating wall 257 by a direct mechanical connection, the power is taken from this wall by fluid means. A fixed wall 265 overlies the flexible wall 257 in close proximity to the uppermost position of the flexible wall, and has air-tight connection with the flexible wall at its edges. A conduit 266 leads from the wall 265 to a tank or reservoir 267. A check valve indicated diagrammatically at 268 is provided between the reservoir 267 and the wall 265, and a second or inlet check valve 269 is also provided in a conduit 270 leading to the conduit 266 from any suitable supply of any desired fluid, be it liquid or gas.

The vibrations of the diaphragm 257 will obviously act as a pump to introduce fluid into the reservoir 267. As the diaphragm 257 moves down, a partial vacuum is created between it and the wall 265, and liquid or gas rushes in through the conduit 270 and past the check valve 269 to fill this vacuum. Then, upon subsequent upward movement of the diaphragm 257, the liquid or gas between this diaphragm and the wall 265 is forced upwardly through the check valve 268 into the reservoir 267. Thus a considerable fluid pressure may be built up within the reservoir 267, and this fluid pressure may be used, concurrently or subsequently, for any desired purpose, such as the driving of any suitable fluid pressure motor indicated diagrammatically at 272.

Figures 14, 15, 19, 21:
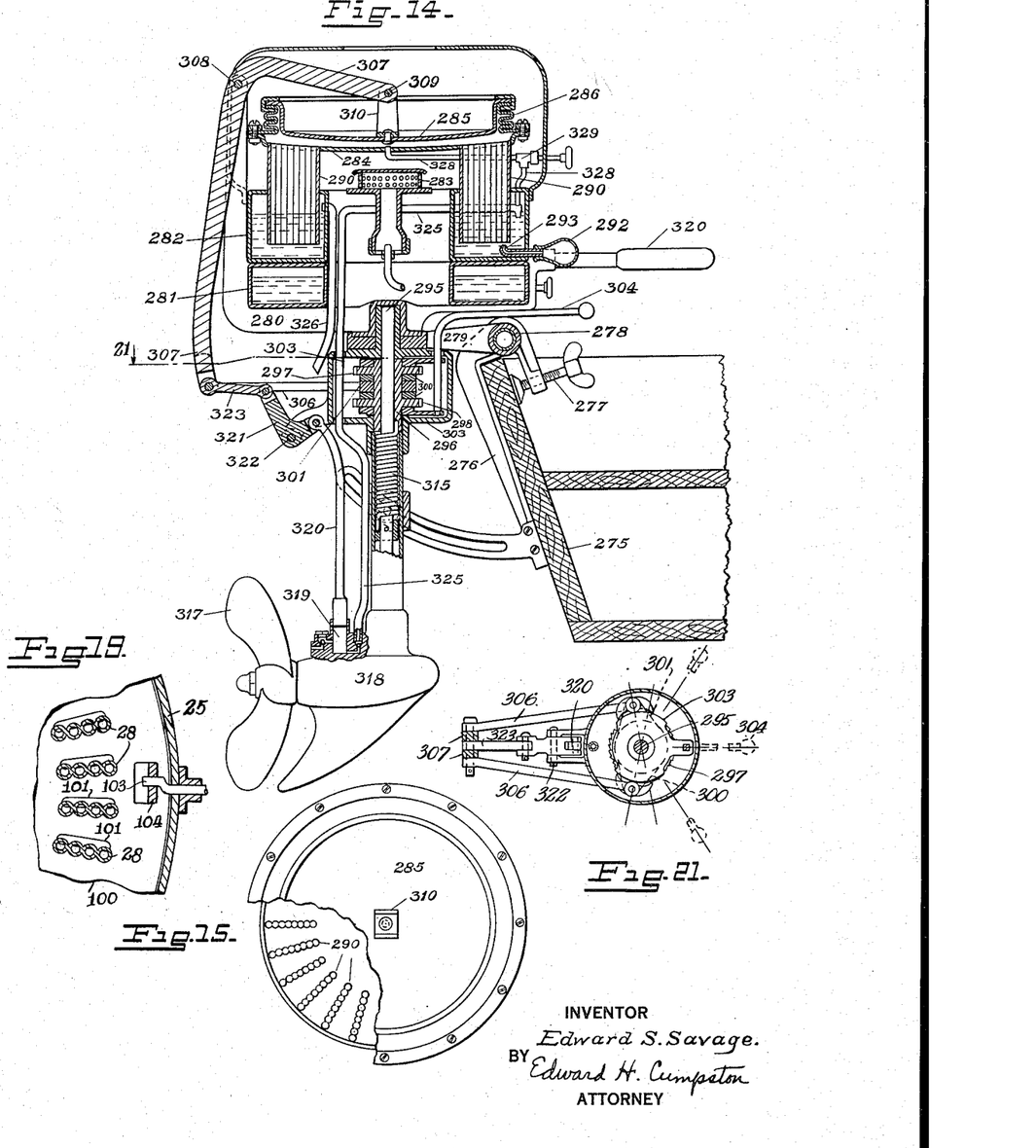
Fig. 14 is a vertical section of an embodiment of the motor of the present invention formed into an outboard motor for a boat, part of the boat being shown also.
Fig. 15 is a plan of part of the motor shown in Fig. 14 with parts broken away.
Fig. 19 is a fragmentary horizontal section taken on the line 19—19 of Fig. 2.
Fig. 21 is a horizontal section taken substantially on the line 21—21 of Fig. 14.

In Figs. 14, 15 and 21 there is illustrated a different embodiment of the invention, applied to an outboard motor. The stern end of any suitable boat is indicated diagrammatically at 275. A bracket 276 is clamped on the stern of the boat by means of screws 277, and the motor frame is pivoted at 278 to this bracket.

This motor frame comprises members 279 and 280, which support a fuel tank 281 and a water tank 282 above the fuel tank, both tanks being conveniently of annular form. A burner indicated diagrammatically at 283, and supplied with fuel from the tank 281, applies heat to the lower wall 284 of the motor chamber. The upper or movable wall of this motor chamber is indicated at 285 and, in this instance, may comprise a relatively rigid dished member rather than a flexible diaphragm, the dished member being connected at its edges to a flexible bellows-like element 286 which, in turn, is connected to the lower wall 284. Thus as the pressure varies within the motor chamber, the movable wall 285 does not itself flex to any appreciable extent but it moves bodily upwardly and downwardly, the bellows 286 expanding or contracting as occasion requires.

Conduits 290 extend downwardly from the motor chamber into the liquid within the water tank 282. The conduits may preferably be arranged in a circular series of substantially radial conduits, as indicated in Fig. 15, grouped around the central burner 283. A primer is provided, comprising a rubber bulb 292 and a nozzle 293 from which liquid may be forced upwardly through one of the conduits 290 into the motor chamber.

Suitably journalled on the motor frame is a vertical shaft 295 on which is rotatably mounted a sleeve 296 carrying the two ratchets 297 and 298, which have teeth extending in opposite directions in a manner similar to the ratchets 56 and 57 previously described in connection with Figs. 1, 2, and 3. Arms 300 and 301 are pivotally mounted on the sleeve 296 between the two spaced ratchets, in a manner similar to the arms 58 and 59 previously described, and these arms carry pawls effective upon the ratchets to drive the ratchets in one direction or the other at will, all as previously described in connection with Figs. 1, 2, and 3. The cams for controlling the ratchets are indicated at 303 (these cams corresponding to the cams 80 and 81 previously described) and they are operated by a control handle 304 which is readily accessible.

The pawl carrying arms 300 and 301 are connected by links 306 to the lower end of a bell crank lever 307 pivoted at 308 to the frame. The other end of the bell crank lever is pivoted at 309 to a bracket 310 secured to the movable wall 285 of the motor chamber. Thus the pressure variations within the motor chamber, will cause upward and downward vibration of the wall 285, which causes corresponding oscillation of the bell crank lever 307 and, through the links 306, will drive the pawls mounted on the arms 300 and 301, to rotate the sleeve 306 in one direction or the other as may be determined by the adjustment of the controlling lever 304.

The sleeve 296 is connected to the vertical shaft 295 by means of a long coiled spring 315 which operates to smooth out the slightly intermittent movements of the sleeve 296 into a substantially continuous rotation of the shaft, in the same manner previously described in connection with the spring 90 in Figs. 1 and 2. The rotation of this vertical shaft 295 drives the propeller 317 through any suitable conventional gearing within the gear housing 318. The boat is steered by means of a handle 320 which permits the entire motor to be turned relatively to the support 279 about a vertical axis coincident with the axis of the shaft 295.

In order to keep the water tank 282 supplied with water, there is provided a plunger pump within the casing 319 below the level of the water in which the boat floats. This pump is driven by a pump rod 320 connected to one arm of a bell crank lever 321 pivoted to the frame at 322, the other arm of the bell crank lever being driven by a link 323 from the lower end of the bell crank lever 307. The operation of the pump 319 forces water upwardly through the conduit 325 into the water tank 282 and constantly supplies fresh cool water to the tank, maintaining the water within this tank up to the level of the overflow conduit 326.

If it is desired to force water into the motor chamber during operation in order to increase the power of the motor, this may be accomplished by providing a branch 328 of the conduit 325 which leads, through a control valve 329, to the motor chamber. Beyond the point where the branch 328 branches off, the conduit 325 is restricted so that enough pressure is built up in the branch conduit 328 to force the liquid into the motor chamber, when the valve 329 is open.

This arrangement described in connection with Fig. 14 is suitable for a full-sized outboard motor for practical use. If the motor is built in small size for the purpose of making a toy, some changes and simplifications can be made. For example, fewer conduits 290 would be required, and instead of providing a separate water supply tank, the conduits could lead directly down into the body of water in which the boat floats.

Figure 16:
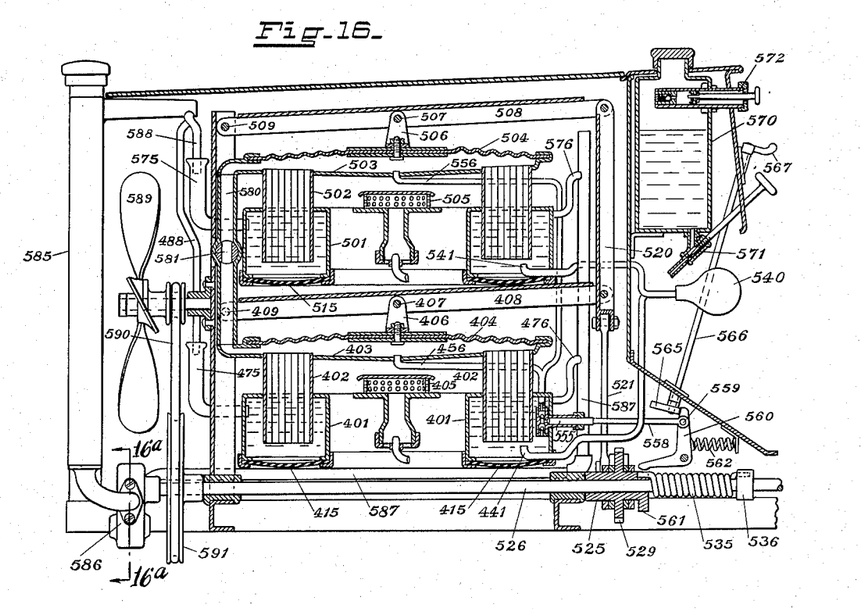
Figures 16A, 17:
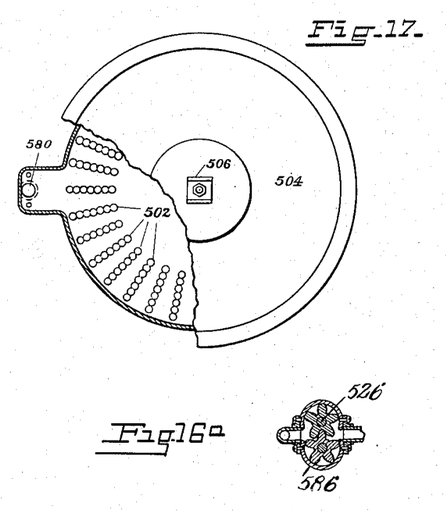
Fig. 16a is a vertical section taken substantially on the line 16a—16a of Fig. 16.
Fig. 17 is a plan of part of the mechanism shown in Fig. 16 with parts broken away.
Figure 18:
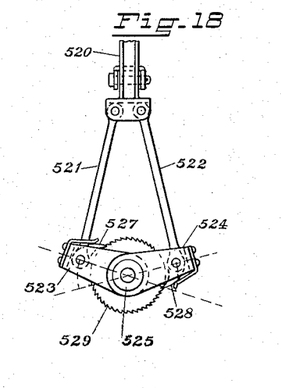
Fig. 18 is an elevation of part of the driving mechanism illustrated in Fig. 16.

A different embodiment of the invention, including a duplex motor or two motor units connected to each other for conjoint operation, is illustrated in Figs. 16, 17, and 18 of the drawings. This embodiment is disclosed in a form particularly suitable for driving a juvenile automobile or motor vehicle, although, of course, it is capable also of many other uses.

The two motor units may be conveniently placed one above another. The lower unit has an annular tank 401 for holding the water or other vaporizable liquid, and a circumferential series of radially arranged conduits 402 extending down into this tank from the bottom wall 403 of the motor chamber means, the top wall of which is in the form of a flexible diaphragm 404. A burner 405 of any suitable form applies heat to the lower chamber wall 403. A bracket 406, secured to the movable wall 404, is pivoted at 407 to the lever arm 408 which is fulcrumed at 409. Preferably one wall or part of a wall of the liquid tank 401 is made flexible so that the tank may have a variable capacity for a purpose hereinafter described, and this may be conveniently accomplished by making the bottom wall 415 of the tank 401, or a substantial part of such bottom wall, of flexible rubber.

The upper motor unit may be similarly constructed, having a liquid tank 501, conduits 502, and a motor chamber with a lower wall 503 and an upper movable wall 504, and a burner 505 for supplying heat. The bracket 506 on the movable wall 504 is pivotally connected at 507 to the lever arm 508 which is fulcrumed at 509. The bottom wall 515 of the liquid tank 501 is of rubber or other suitable flexible construction.

The two lever arms 408 and 508 are connected to each other by a link 520 which is pivoted to both of them, and this link, in turn, carries two pivoted connecting rods 521 and 522 (Fig. 18) which are pivoted to arms 523 and 524, respectively, rotatably mounted on a sleeve 525 which is rotatable on a driving shaft 526. Pawls 527 and 528 mounted on the arms 523 and 524, respectively, operate upon a ratchet 529 secured to or formed integrally with the sleeve 525, so that upon either upward or downward movement of the link 520, the ratchet 529 and its sleeve 525 are rotated in a clockwise direction when viewed as in Fig. 18. The rotation of this sleeve is transmitted through the long coiled spring 535 to the collar 536 secured on the shaft 526, so that the shaft is thus driven in a smooth and continuous manner. This shaft, in turn, may drive the wheels of a motor vehicle in any suitable manner, such as through the conventional change speed transmission gearing or through a variable speed frictional drive, or otherwise.

A compressible primer bulb 540 is provided to force liquid from the nozzles 441 and 541 upwardly through one of the conduits 402 and 502, respectively, to introduce the initial liquid into the motor chambers for priming purposes.

For the introduction during operation of such additional liquid as may be required to produce maximum power in the motor, there is provided a pump 555 pumping liquid from one of the liquid tanks (in this instance, lower tank 401) through conduits 456 and 556 leading to the lower and upper motor chambers, respectively. This pump may be of the plunger variety and may be driven by a pump rod 558 pivoted at 559 to one arm of a bell-crank lever 560, the other arm of which is in position to be actuated by a cam 561 formed on the rotating sleeve 525. A spring 562 tends to move the bell-crank 560 in a direction opposite to that in which it is actuated by the cam. An adjustable cam 565 on a rod 566 having an adjusting handle 567, lies in the path of travel of the bell-crank 560, and by suitable adjustment of the handle 567 the bell-crank can be restricted in its travel under the influence of the spring 562, so as to shorten the stroke of the pump operating rod 558 and thus to vary the capacity of the pump 555 to introduce liquid into the motor chambers at the most advantageous rate.

Fuel is supplied to the burners 405 and 505 from any suitable supply such as from the fuel tank 570, the flow of fuel being controlled by a valve 571. If the fuel burners are of the type which require the fuel to be supplied under considerable pressure when starting the burners, a force pump 572 may be provided in connection with the fuel tank 570 to build up the required pressure in this tank.

In order to produce the most efficient operation of the two motor units it is desirable to synchronize the pressure variations within the two motor chambers, so that the pressure will fall in both chambers at the same time and rise in both chambers at the same time. Otherwise, the pressure variations in one chamber might become out of phase with those in the other, with the result that one motor unit might tend to move the link 520 downwardly while the other might exert a counter-acting force tending to move the link upwardly, and no useful work would be accomplished. The means for synchronizing the pressure variations, in the present instance, comprises a conduit 580 of reasonably large cross sectional area, leading from one motor chamber means to the other motor chamber means. A valve 581 may be provided in this conduit for shutting it off when desired so that one motor unit may be efficiently operated alone without the other. When the valve is open, however, it is apparent that the pressure variations of the two motor units must occur substantially in synchronism with each other, and the two units will therefore continue to run in synchronism in an efficient manner for an indefinite length of time. Any number of units could be thus connected.

The supply of vaporizable liquid for an automobile or other movable unit not floating in water, presents special problems if the motor is on a practical operating unit and not upon a mere toy. A practical operating automobile, whether for adults or for children, is apt to be run up and down hills and not merely on the level, with the result that the level of the water or other vaporizable liquid may change considerably in various parts of the liquid tanks when the vehicle is run up or down hills or when it tilts sidewise. This variation of the water level may cause irregular operation of the motor, and in some instances the variation might be so extreme as to uncover the lower end of one of the conduits leading from the motor chamber, which would put the motor out of operation because it is essential during operation to have the motor chamber substantially completely sealed by a liquid seal at all times. At the same time, in an effort to maintain the liquid level at the proper elevation, the water or other vaporizable liquid must not be so closely confined that there is no chance for liquid to be partially expelled from or sucked into the conduits as is required during the operation of the motor. These difficulties are solved by the construction illustrated in Fig. 16, in which the liquid tanks 401 and 501 have tops which form complete closures fitting in a water-tight manner around the conduits 402 and 502, and the tanks are kept filled, by liquid introduced through the spouts 475 and 575, up to the level of the overflow conduits 476 and 576, respectively. The overflow conduits maintain the water level at a point somewhat above the tops of the tanks 401 and 501, so that the liquid in these tanks is actually under some hydrostatic head. The flexible bottoms 415 and 515, of rubber or other suitable flexible material, provide for expansion and contraction of the capacity of the tanks, however, when the pressure variations within the motor chambers force liquid out of or suck liquid into the conduits 402 and 502. For example, when the pressure builds up in the motor chambers, the rush of liquid out of the conduits into the tanks is permitted by the flexible tank bottoms, which bend downwardly to increase the tank capacities, and upon a reduction of the pressure in the motor chambers, some of the liquid is sucked back into the conduits and the flexible tank bottoms move upwardly again to decrease the capacity of the tanks.

It is important that the water or other liquid in the tanks 401 and 501 be kept relatively cool, because if this liquid approaches its vaporized temperature, the operation of the motor will cease because there is not sufficient temperature difference to produce the necessary quick condensation of the vapors within the motor chamber. The supply of sufficient cool liquid presents no difficulty, of course, when a motor is stationary, or when it is used on a boat which has a plentiful supply of cool water all around it. In an automobile or airplane, however, and in similar moving units, means for cooling the liquid supply should be provided if the motor is to be continued in operation for any great length of time.

In the present embodiment, therefore, there is provided a radiator 585 which may be of any conventional form used in motor vehicles. A pump indicated at 586, Figs. 16 and 16a, and driven from the main drive shaft 526, receives liquid through the conduit 587 into which the overflow conduits 476 and 576 discharge, and pumps this liquid into the lower end of the radiator 585, from the upper end of which it is discharged through the conduit 588 leading to the filling spout 575 of the upper liquid tank 501, and through the conduit 488 leading to the filling spout 475 of the lower liquid tank 401. A fan 589 driven by a belt 590 from a pulley 591 on the main shaft 526 draws air through the radiator 585 and promotes the cooling of the liquid.

The feature of having a flexible wall for the liquid tank, such as 415 or 515, may obviously be applied to any of the other embodiments of the invention and is not intended exclusively for use in the embodiment illustrated in Fig. 16. Indeed, all of the embodiments are but illustrative, and any details of construction which happen to be shown in connection with one form of the invention might be used equally well with other forms of the invention wherever desired, and such use is contemplated.

It is now apparent that an improved and simplified motor has been provided, capable of manufacture relatively inexpensively, and having few parts, and it is seen that this motor is adaptable either to toys or to practical power production or industrial uses.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A motor comprising walls forming chamber means, one of said walls being movable, a supply of vaporizable liquid, conduit means forming a constantly open communicating passageway connecting said chamber means at all times to said liquid, means for supplying heat to said chamber means to cause said movable wall to vibrate, and means connected to said vibrating wall for taking power therefrom.

2. A motor comprising walls forming chamber means, one of said walls being movable, a supply of vaporizable liquid, conduit means forming a constantly open communicating passageway connecting said chamber means at all times to said supply of liquid, means for supplying heat to said chamber means to cause said movable wall to vibrate, a rotary member, and means operatively connecting said movable wall to said rotary member to cause rotation of said member by vibrations of said movable wall.

3. A motor comprising walls forming chamber means, one of said walls being movable in response to variations in pressure within said chamber means, a supply of vaporizable liquid, a plurality of conduits extending from said chamber means to said liquid, said conduits being constantly open during operation of the motor to establish communication between said chamber means and said liquid, means for heating a wall of said chamber means to cause vibration of said movable wall by intermittent pressure variations within said chamber means, and power means driven by vibrations of said movable wall.

4. A motor comprising walls forming chamber means, one of said walls being movable in response to variations in pressure within said chamber means, a supply of varporizable liquid having a level below said chamber means, a plurality of constantly open conduits extending from said chamber means to said liquid, means for heating a wall of said chamber means to cause vibration of said movable wall by intermittent pressure variations within said chamber means, a rotary shaft, and means operatively connecting said shaft to said movable wall to cause rotation of said shaft by vibration of said movable wall.

5. A motor comprising walls forming chamber means, one of said walls being movable in response to variations in pressure within said chamber means, a supply of vaporizable liquid, a multiplicity of conduits each extending from said chamber means into said liquid and providing open communication between said chamber means and said liquid constantly during operation of the motor, means for heating a wall of said chamber means to cause intermittent pressure variations therein to produce vibration of said movable wall, and power transmitting means connected to and operated by vibration of said movable wall.

6. A motor comprising walls forming chamber means, one of said walls being movable in response to variations in pressure within said chamber means, a supply of vaporizable liquid, a plurality of conduits constantly open during operation of the motor and extending from said chamber means into said liquid, means for heating a wall of said chamber means to cause intermittent pressure variations therein to produce vibration of said movable wall, means for introducing liquid into said chamber means to facilitate formation of vapor therein, and power transmitting means connected to and operated by vibration of said movable wall.

7. A motor comprising walls forming chamber means, one of said walls being movable in response to variations in pressure within said chamber means, a supply of vaporizable liquid, a plurality of conduits extending from said chamber means into said liquid, at least a part of said conduits being constantly open during operation of the motor to provide communication at all times between said chamber means and said liquid, means for heating a wall of said chamber means to cause intermittent pressure variations therein to produce vibration of said movable wall, means for introducing liquid into said chamber means to prime said motor ready for operation, and power transmitting means connected to and operated by vibration of said movable wall.

8. A motor comprising walls forming chamber means, one of said walls being movable in response to variations in pressure within said chamber means, a supply of vaporizable liquid, a plurality of conduits extending from said chamber means into said liquid, at least a part of said conduits being constantly open during operation of the motor to provide communication at all times between said chamber means and said liquid, means for heating a wall of said chamber means to cause intermittent pressure variations therein to produce vibration of said movable wall, means for introducing liquid into said chamber means to prime said motor ready for operation and for introducing liquid into said chamber means during operation of the motor, and power transmitting means connected to and operated by vibration of said movable wall.

9. A motor comprising walls forming chamber means, one of said walls being movable, a supply of vaporizable liquid at least partly below said chamber means, conduit means extending from said chamber means downwardly into said liquid and establishing free communication therebetween at all times during normal operation of a motor, means for supplying heat to said chamber means to cause said movable wall to vibrate, and power means driven by vibrations of said movable wall.

10. A motor comprising walls forming chamber means, one of said walls being movable, a supply of vaporizable liquid at least partly beneath said chamber means, conduit means extending substantially vertically downwardly from said chamber means into said liquid and establishing free communication therebetween at all times during normal operation of the motor, means for supplying heat to said chamber means to cause said movable wall to vibrate, and power means driven by vibrations of said movable wall.

11. A motor comprising walls forming chamber means, one of said walls being a flexible diaphragm movable in response to variations of pressure within said chamber means, a supply of vaporizable liquid, conduit means connecting said chamber means to said liquid and forming a constantly open communication between said chamber means and said liquid, means for supplying heat to said chamber means to cause pressure variations within said chamber means and thereby to move said diaphragm, and power means driven by vibration of said diaphragm.

12. A motor comprising walls forming chamber means, one of said walls being movable, power means driven by vibrations of said movable wall, a supply of vaporizable liquid, heating means for supplying heat to said chamber means externally thereof, and a series of conduits grouped around said heating means and connecting said chamber means to said liquid to establish constant communication therebetween during operation of the motor.

13. A motor comprising walls forming chamber means, one of said walls being a bottom wall and another of said walls being movable, a supply of vaporizable liquid, heating means for directing heat against said bottom wall adjacent the center thereof to produce pressure variations within said chamber means, and a substantially circular series of conduits extending downwardly from said bottom wall to said liquid around said heating means for connecting the interior of said chamber means to said liquid, at least part of said conduits being constantly open during normal operation of the motor to provide communication at all times between said chamber means and said liquid.

14. A motor comprising walls forming chamber means, one of said walls being movable, a supply of vaporizable liquid, conduit means connecting said chamber means to said liquid and providing open communication therebetween at all times during normal operation of the motor, said conduit means having a cross section elongated in one direction and subdivided into a plurality of compartments, means for supplying heat to said chamber means to cause variations of pressure therein and thereby to cause vibration of said movable wall, and driving means operated by vibration of said movable wall.

15. A motor for propelling watercraft comprising walls forming chamber means, one of said walls being movable in response to variations of pressure within said chamber means, a water supply tank adjacent said chamber means and adapted to hold water to a level independent of the level of water in which the watercraft may be situated, a plurality of conduits connecting the interior of said chamber means to the water within said tank, means for heating said chamber means to produce pressure variations therein and thereby to cause vibration of said movable wall, propeller means immersed in the water in which said watercraft may be situated, means operatively connecting said movable wall of said chamber means to said propeller means to cause operation of said propeller means by vibration of said movable wall, and pump means operated by vibration of said movable wall for pumping water from the body of water in which said watercraft is situated into said water supply tank.

16. A motor comprising walls forming chamber means, one of said walls being movable in response to variations in pressure within said chamber means, a supply tank for holding vaporizable liquid adjacent said chamber means, conduit means connecting said chamber means to said supply tank and forming a constantly open communicating passageway between said chamber means and the liquid within said tank, means for heating said chamber means to cause pressure variations therein and thereby to cause vibration of said movable wall, a shaft, means operatively connecting said movable wall to said shaft to cause rotation of said shaft by vibration of said movable wall, a radiator, and means for circulating liquid from said supply tank through said radiator.

17. A motor comprising walls forming a plurality of chambers each having a wall movable in response to variations in pressure within its associated chamber, means for holding vaporizable liquid, conduit means connecting each of said chambers to said vaporizable liquid, means for heating each of said chambers to cause pressure variations therein and thereby to cause vibrations of said movable walls, means operatively connected to said movable walls to be driven by vibrations of said movable walls, and conduit means connecting one of said chambers to the other of said chambers to tend to equalize the pressures within the two chambers so that the respective movable walls of the two chambers will vibrate substantially in unison.

18. A motor comprising walls forming chamber means, one of said walls being movable, tank means for holding a supply of vaporizable liquid, conduit means connecting said chamber means to said tank means, and means for supplying heat to said chamber means to cause pressure variations within said chamber means and thereby to cause vibration of said movable wall, a wall of said tank means having a flexible portion adapted to move outwardly and inwardly to provide variable capacity of said tank means.

19. A motor comprising means for holding a supply of vaporizable liquid, means forming a chamber having a portion movable in response to variations in pressure within said chamber, conduit means forming a constantly open communicating pasageway connecting said chamber to said liquid at all times during normal operation of said motor, means for heating said chamber to vaporize liquid therein to increase pressure within said chamber to drive vapor into said conduit means to be condensed therein to reduce pressure within said chamber to draw liquid through said conduit means toward said chamber to be again vaporized, and means for taking power from the movements of said movable portion of said chamber.

20. A motor comprising chamber means having a portion movable in response to pressure variations within said chamber means, a plurality of open conduits connected to said chamber means and extending in a generally downward direction therefrom and adapted to extend into a supply of relatively cool vaporizable liquid, said conduits forming a constantly open communicating passageway connecting said chamber means to said liquid, means for heating said chamber means to vaporize liquid therein to increase the pressure within said chamber means and thereby to drive vapor down said conduits so that part of said vapor is condensed by contact with cool portions of said conduits, thereby reducing the pressure within said chamber means to tend to draw liquid upwardly through said conduits until the liquid comes into contact with hot portions of said conduits or said chamber means and is vaporized thereby to increase the pressure within said chamber means and to cause repetition of the cycle, and means for taking power from the movements of said movable portion of said chamber means.

21. A motor comprising chamber means having a portion movable in response to pressure variations within said chamber means, a plurality of conduits leading from said chamber means into a supply of relatively cool vaporizable liquid and forming a constantly open communicating passageway between said chamber means and said liquid, means for supplying heat to said chamber means to cause rapid alternating pressure variations within said chamber means and alternating flow of said cool liquid into and out of said plurality of conduits, adjustable valve means acting concomitantly upon a plurality of said conduits to control the rate of flow therein, and means for taking power from the movements of said movable portion of said chamber means.

22. A motor comprising chamber means having a portion movable in response to pressure variations within said chamber means, a plurality of conduits leading from said chamber means into a supply of relatively cool vaporizable liquid, means for supplying heat to said chamber means to cause rapid alternating pressure variations within said chamber means and alternating flow of said cool liquid into and out of said plurality of conduits, an adjustable valve plate having portions movable concomitantly into and out of obstructing relationship to a plurality of said conduits to control the rate of flow therein, and means for taking power from the movements of said movable portion of said chamber means.

23. A motor comprising walls forming chamber means, one of said walls being movable in response to variations in pressure within said chamber means, a supply of vaporizable liquid, a plurality of conduits extending from said chamber means into said liquid and forming a constantly open communicating passageway between said chamber means and said liquid, means for heating a wall of said chamber means to cause intermittent pressure variations therein to produce vibration of said movable wall, means for introducing liquid into said chamber means to facilitate formation of vapor therein, thermostatic means for controlling said liquid introducing means, and means for taking power from the vibrations of said movable wall.

24. A motor comprising walls forming chamber means, one of said walls being movable in response to variations in pressure within said chamber means, a supply of vaporizable liquid, a plurality of constantly open conduits extending from said chamber means into said liquid, said conduits forming a constantly open passageway connecting said chamber means to said liquid, means for heating a wall of said chamber means to cause intermittent pressure variations therein to produce vibration of said movable wall, means for taking power from said movable wall, and means for injecting liquid into one of said conduits adjacent the end thereof which extends into said liquid, so that the injected liquid will flow through said conduit and into said chamber means.

25. A motor comprising walls forming chamber means, one of said walls being movable in response to variations in pressure within said chamber means, a supply of vaporizable liquid, a plurality of constantly open conduits extending from said chamber means into said liquid, said conduits forming a constantly open passageway connecting said chamber means to said liquid, means for heating a wall of said chamber means to cause intermittent pressure variations therein to produce vibration of said movable wall, means for taking power from said movable wall, and nozzle means within said liquid alined substantially with an open end of one of said conduits for forcing liquid into said open end and through said one of said conduits into said chamber means.

26. A toy boat comprising a hull adapted to float in water, a water holding compartment within said hull, means forming a passageway between said compartment and the exterior of said hull at an elevation materially above the bottom of said compartment and at or below the normal water line when the hull is floating, walls forming chamber means, one of said walls being movable in response to variations in pressure within said chamber means, conduit means extending from said chamber means into said water holding compartment below the water level therein and forming a constantly open communicating passageway between said chamber means and the water within said compartment, means for heating said chamber means to cause intermittent pressure variations therein to produce vibration of said movable wall, and means operated by the vibrations of said movable wall for driving said hull through the water in which it floats.

27. A motor comprising means for holding a supply of vaporizable liquid, means forming a chamber having a portion movable in response to variations of pressure within the chamber, conduit means connecting said chamber to said liquid, means for heating said chamber to vaporize liquid therein to increase pressure within said chamber to drive vapor into said conduit means to be condensed therein to reduce pressure within said chamber to draw liquid through said conduit means toward said chamber to be again vaporized, auxiliary means for introducing liquid into said chamber to facilitate formation of vapor therein, and means for taking power from the movements of said movable portion of said chamber.

28. A motor comprising means for holding a supply of vaporizable liquid, means forming a chamber having a portion movable in response to variations of pressure within the chamber, conduit means connecting said chamber to said liquid, means for heating said chamber to vaporize liquid therein to increase pressure within said chamber to drive vapor into said conduit means to be condensed therein to reduce pressure within said chamber to draw liquid through said conduit means toward said chamber to be again vaporized, auxiliary means for introducing liquid into said chamber to facilitate formation of vapor therein, thermostatic means for controlling said auxiliary liquid introducing means, and means for taking power from the movements of said movable portion of said chamber.

29. A motor comprising means for holding a supply of vaporizable liquid, means forming a chamber having a portion movable in response to variations of pressure within the chamber, a plurality of conduits connecting said chamber to said liquid, means for heating said chamber to vaporize liquid therein to increase pressure within said chamber to drive vapor into said conduit means to be condensed therein to reduce pressure within said chamber to draw liquid through said conduit means toward said chamber to be again vaporized, means for injecting liquid into one of said conduits adjacent the end thereof which extends into said liquid, so that the injected liquid will flow through said conduit and into said chamber means, and means for taking power from the movements of said movable portion of said chamber.

30. A motor comprising means for holding a supply of vaporizable liquid, means forming a chamber having a portion movable in response to variations of pressure within the chamber, a plurality of conduits connecting said chamber to said liquid, means for heating said chamber to vaporize liquid therein to increase pressure within said chamber to drive vapor into said conduit means to be condensed therein to reduce pressure within said chamber to draw liquid through said conduit means toward said chamber to be again vaporized, means for introducing liquid into said chamber to prime said motor ready for operation, and power means operated by said movement of said movable portion of said chamber.

31. A motor comprising means for holding a supply of vaporizable liquid, means forming a chamber having a portion movable in response to variations of pressure within the chamber, a plurality of conduits connecting said chamber to said liquid, means for heating said chamber to vaporize liquid therein to increase pressure within said chamber to drive vapor into said conduit means to be condensed therein to reduce pressure within said chamber to draw liquid through said conduit means toward said chamber to be again vaporized, means for introducing liquid into said chamber to prime said motor ready for operation and for introducing liquid into said chamber during operation of the motor, and power means operated by movement of said movable portion of said chamber.

EDWARD S. SAVAGE.